United States Patent
Lagnado

(10) Patent No.: US 10,171,188 B2
(45) Date of Patent: Jan. 1, 2019

(54) MOBILE COMPUTING DEVICE INCLUDING A GRAPHICAL INDICATOR

(71) Applicant: HEWLETT-PACKARD DEVELOPMENT COMPANY, L.P., Houston, TX (US)

(72) Inventor: Isaac Lagnado, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/517,710

(22) PCT Filed: Dec. 2, 2014

(86) PCT No.: PCT/US2014/068041
§ 371 (c)(1),
(2) Date: Apr. 7, 2017

(87) PCT Pub. No.: WO2016/089366
PCT Pub. Date: Jun. 9, 2016

(65) Prior Publication Data
US 2017/0317770 A1    Nov. 2, 2017

(51) Int. Cl.
*H04B 17/23* (2015.01)
*H04B 17/318* (2015.01)
*G06F 3/02* (2006.01)
*G06F 3/16* (2006.01)

(52) U.S. Cl.
CPC ......... *H04B 17/318* (2015.01); *G06F 3/0219* (2013.01); *G06F 3/167* (2013.01); *H04B 17/23* (2015.01)

(58) Field of Classification Search
CPC ........ H04B 17/318; H04B 17/23; H04B 7/15; H04W 4/02; H01Q 1/2216; H01Q 1/243; H04M 1/021; H04M 1/0235; H04M 1/0245; G06F 3/167; G06F 3/0219; G08B 13/1427
See application file for complete search history.

(56) References Cited

U.S. PATENT DOCUMENTS

| | | |
|---|---|---|
| 8,620,386 B2 | 12/2013 | Fujii |
| 2006/0009268 A1 | 1/2006 | Kitakado |
| 2008/0039012 A1 | 2/2008 | McKay et al. |
| 2010/0190537 A1 | 7/2010 | Fujii |
| 2012/0322374 A1 | 12/2012 | Yamaoka et al. |

(Continued)

FOREIGN PATENT DOCUMENTS

| | | |
|---|---|---|
| JP | 2010102531 | 5/2010 |
| JP | 2012169752 A | 9/2012 |
| KR | 10-2011-0080945 A | 7/2011 |

OTHER PUBLICATIONS

Wong, Kin-Lu, et al.; "Body SAR Study of the Planar WWAN Monopole Slot Antenna for Tablet Device Application"; May 17, 2011; 2 pages.

*Primary Examiner* — Thanh Le
(74) *Attorney, Agent, or Firm* — HPI Patent Department

(57) ABSTRACT

An example mobile computing device includes a display, a housing coupled to the display, and a graphical indicator. The housing includes a chamber, an antenna to communicate with a wireless network, and an exterior antenna region. The graphical indicator identifies the exterior antenna region on the housing and a signal strength of a connection to the wireless network.

15 Claims, 4 Drawing Sheets

(56) References Cited

U.S. PATENT DOCUMENTS

2012/0322380 A1* 12/2012 Nannarone ........ G08B 13/1427
455/41.2
2014/0007019 A1    1/2014 Saukko et al.
2015/0365280 A1* 12/2015 Lohrey .................. H04W 4/02
370/254

* cited by examiner

MOBILE COMPUTING DEVICE INCLUDING A GRAPHICAL INDICATOR

BACKGROUND

Mobile computing devices include a housing, a display, and an antenna. A user holds the housing to operate the mobile computing device. The antenna establishes a connection between the mobile computing device and a wireless network to transmit information there through.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Mobile computing devices include a housing, a display, and an antenna. Mobile computing devices may establish a connection with and communicate through a wireless network. A user holds the housing to operate the mobile computing device. At times, a user's hand and/or object may unknowingly contact a specific portion of the housing proximate to the antenna that may act to shield and/or detune the antenna. Such user actions may result in a reduction of the signal strength of the wireless network and an inability to maintain a high-quality network connection. For example, the hand and/or object may undesirably shield and/or detune the antenna and thereby decrease the overall wireless performance of the mobile computing device.

In examples, a mobile computing device includes a display, a housing coupled to the display, and a graphical indicator. The housing includes a chamber, an antenna to communicate with a wireless network, and an exterior antenna region. The graphical indicator identifies the exterior antenna region on the housing and a signal strength of a connection to the wireless network. At times, the user may be holding the housing in a manner that shields and/or detunes the antenna. The graphical indicator provides information to the user to enable the user to avoid shielding and/or detuning the antenna and to reposition his or her hands on the housing outside of the exterior antenna region. Thus, a degradation of wireless performance through reduction of the signal strength of the wireless network and detuning of the antenna can be circumvented by the user.

Figure 1:
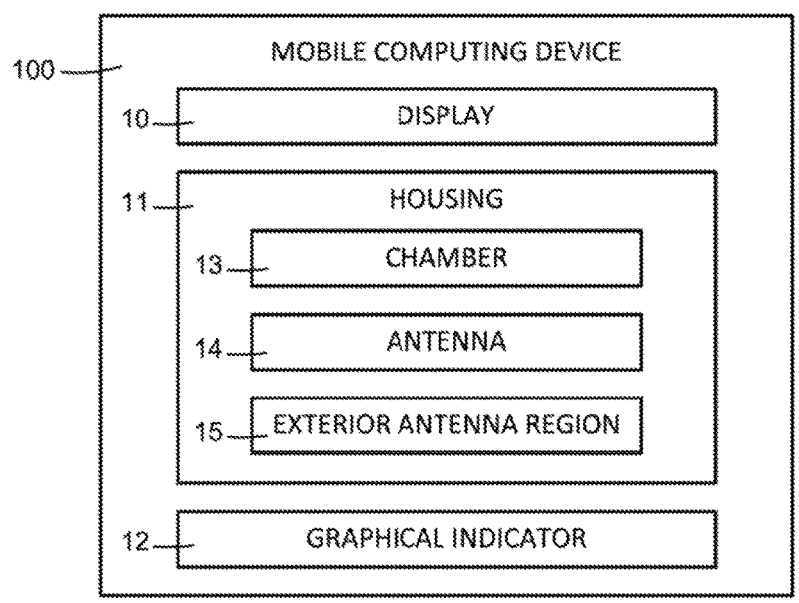
FIG. 1 is a block diagram illustrating a mobile computing device according to an example.

FIG. 1 is a block diagram illustrating a mobile computing device according to an example. Referring to FIG. 1, a mobile computing device 100 includes a display 10, a housing 11, and a graphical indicator 12. The display 10 may include an electronic screen such as a light emitting diodes (LED) screen, a liquid crystal display (LCD), an organic light emitting diodes (OLED) screen, a plasma display, and the like. The housing 11 is coupled to the display 10. The housing 11 includes a chamber 13, an antenna 14 to communicate with a wireless network, and an exterior antenna region 15.

Referring to FIG. 1, the housing 11 may be in a form of an enclosure to be held by a user. The chamber 13 may house a printed circuit board (PCB) including electronics for operation of the mobile computing device 100. In some examples, the antenna 14 may be located on and/or extend from the PCB. The antenna 14 establishes a connection with a wireless network to enable the mobile computing device 100 to communicate there through. The housing 11 may be held by a user to operate the mobile computing device 100 such as an electronic tablet, a smart phone, and the like. The graphical indicator 12 identifies the exterior antenna region 15 on the housing 11 and a signal strength of a connection to the wireless network. The exterior antenna region 15 is a portion of the housing 10 that is proximate to the antenna 14. The signal strength may include a strength of a wireless signal received by and/or transmitted from the antenna of the mobile computing device. In some examples, the signal strength may also include a quality of the wireless signal including modulation errors, noise error levels, and the like.

Referring to FIG. 1, when a user holds the mobile computing device 100 in an orientation in which the user's hand contacts the exterior antenna region 15 of the housing 11, the effectiveness of the antenna 14 may be reduced. For example, the user's hand may negatively impact the antenna 14 resulting in reducing the signal strength of a connection to the wireless network and detuning thereof. In response to the information provided by the graphical indicator 12 identifying the exterior antenna region 15 and the signal strength, the user may reorient the mobile computing device 100 and hold a different portion of the housing 11 outside of the exterior antenna region 15.

Figure 2:
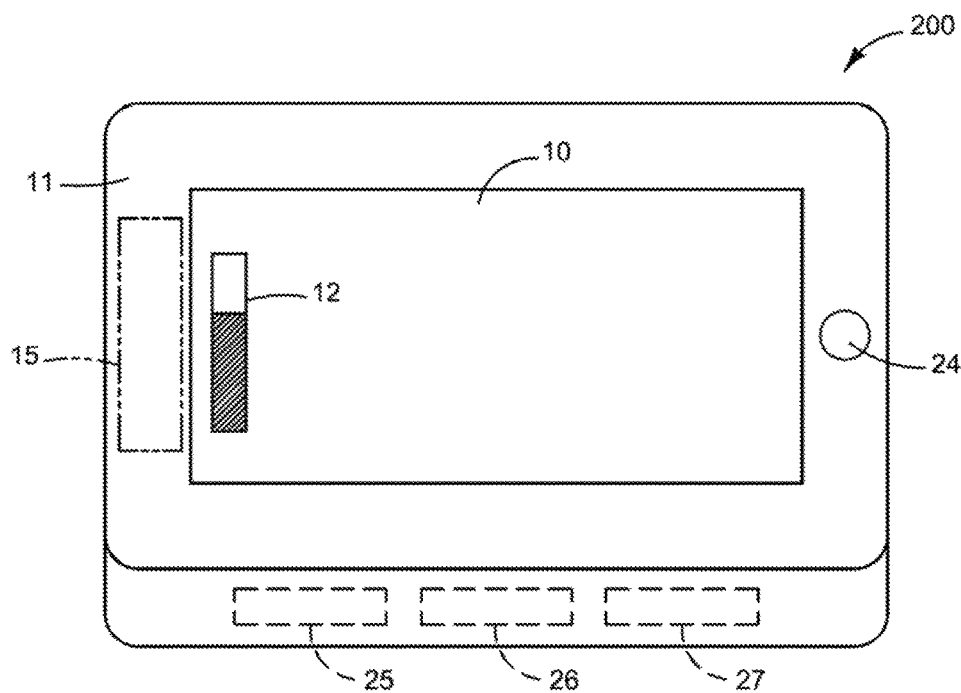
FIG. 2 is a schematic view illustrating a mobile computing device according to an example.
Figure 3:
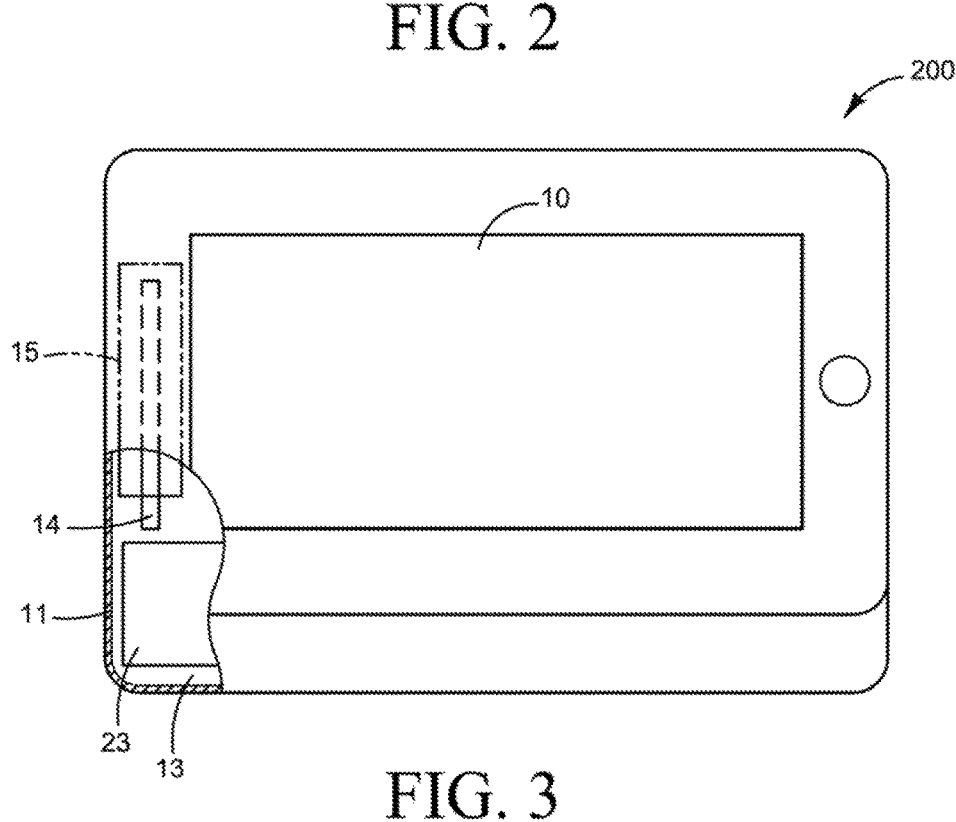
FIG. 3 is a schematic view illustrating a portion of the mobile computing device of FIG. 2 according to an example.

FIG. 2 is a schematic view illustrating a mobile computing device according to an example. FIG. 3 is a schematic view illustrating a portion of the mobile computing device of FIG. 2 according to an example. The mobile computing device 200 may include the display 10, the housing 11, and the graphical indicator 12 as previously described with respect to the mobile computing device 100 of FIG. 1. Referring to FIGS. 2 and 3, in some examples, the housing 11 is coupled to the display 10. The housing 11 includes a chamber 13, an antenna 14 to communicate with a wireless network, and an exterior antenna region 15. The exterior antenna region 15 is a portion of the housing 11 that is proximate to the antenna 14.

For example, the antenna 14 may reside on and/or extend from a PCB 23 disposed in the chamber 13 of the housing 11. In some examples, the exterior antenna region 15 may include the respective portion of the housing 11 that is proximate and/or adjacent to the antenna 15. The housing 11 may be in a form of an enclosure to be held by a user. The housing 11 may be held by a user to operate the mobile computing device 200 such as an electronic tablet, a smart phone, and the like. The graphical indicator 12 identifies an exterior antenna region 15 on the housing 11 and the signal strength of a connection to the wireless network.

Referring to FIGS. 2 and 3, in some examples, a location module 25 determines the location of the antenna 14, a signal detection module 26 determines the signal strength of a connection to the wireless network, and a graphics module 27 displays the graphical indicator 12 on a respective location on the display 10. In some examples, the location module 25 may include machine-readable instructions to enable an antenna location to be populated based on a handshake from a host system. For example, the antenna location may be provided to the location module 25 by the BIOS, a localized table based on system identification, and the like. In some examples, the signal detection module may include a software application program interface from the operating system that provides updated status and events associated with signal strength. In some examples, the graphics module 27 may include a graphics processor to process video signals to format video images in the form of pixels on the display 10.

In some examples, the location module 25, the signal detection module 26, and/or the graphics module 27 may be implemented in hardware, software including firmware, or combinations thereof. The firmware, for example may be stored in memory and executed by a suitable instruction-execution system. If implemented in hardware, as in an alternative example, the location module 25, the signal detection module 26, an for the graphics module 27 may be implemented with any or a combination of technologies which are well known in the art (for example, discrete-logic circuits, application-specific integrated circuits (ASICs), programmable-gate arrays (PGAs), field-programmable gate arrays (FPGAs)), and/or other later developed technologies. In other examples, the location module 25, the signal detection module 26, and/or the graphics module 27 may be implemented in a combination of software and data executed and stored under the control of the mobile computing device 200.

Referring to FIGS. 2 and 3, in some examples, the graphical indicator 12 selectively appears on the display 10 in response to an event. The event may include a manual user event such as selection of a key by a user (e.g., hot key, function key, etc.), issuing a voice command by a user, and the like. Alternatively, the event may include an automatic event such as a reduction of signal strength below a predetermined signal strength threshold. The automatic event may also include a reduction of a threshold signal strength amount within a predetermined time period. That is, a sudden decrease in a sufficient amount of signal strength may correspond to the antenna 14 being undesirably shielded and/or do tuned due to a user contacting the exterior antenna region 15 of the housing 11. Alternatively, the graphical indicator 12 may only be displayed with respect to the current active connection, such that the user is only provided an indication for the current wireless connection. For example if the user is currently connected to WWAN, then only the graphical indicator for WWAN may be displayed (and not the WLAN).

Further, in some examples, the graphical indicator 12 is a dialog region appearing on the display 10 proximate to the exterior antenna region 15. That is, a location of the graphical indicator 12 on the display 10 is indicative of a location of the antenna 14. The graphical indicator 12 also includes a graphical representation of the signal strength. For example, the graphical representation of the signal strength may correspond to at least one of a plurality of colors, a plurality of symbols, and an amount of fill of a first image. In some examples, the graphical representation of the signal strength may include a rectangle having a varying amount of fill therein indicative of the signal strength.

At times, a user may hold the mobile computing device 200 in an orientation in which the users hand contacts the exterior antenna region 15 of the housing 11, the effectiveness of the antenna 15 may be reduced. For example, the users hand may shield and/or detune the antenna 15 resulting in a reduction of signal strength. Thus, the user may reorient the mobile computing device 200 and hold a different portion of the housing 11 outside of the exterior antenna region 15 based on the graphical indicator 12 identifying the exterior antenna region 15 and signal strength. In some examples, the wireless network may include one of a wireless wide area network (WWAN) and a wireless local area network (WLAN). Wireless networks provide information such as data without cables. The data may include telephone calls, web pages, streaming video, and the like. A WWAN, for example, is one type of a wireless network. A WLAN is another type of wireless network. A WWAN generally uses mobile telecommunication cellular network technologies to transfer data.

Figure 4:
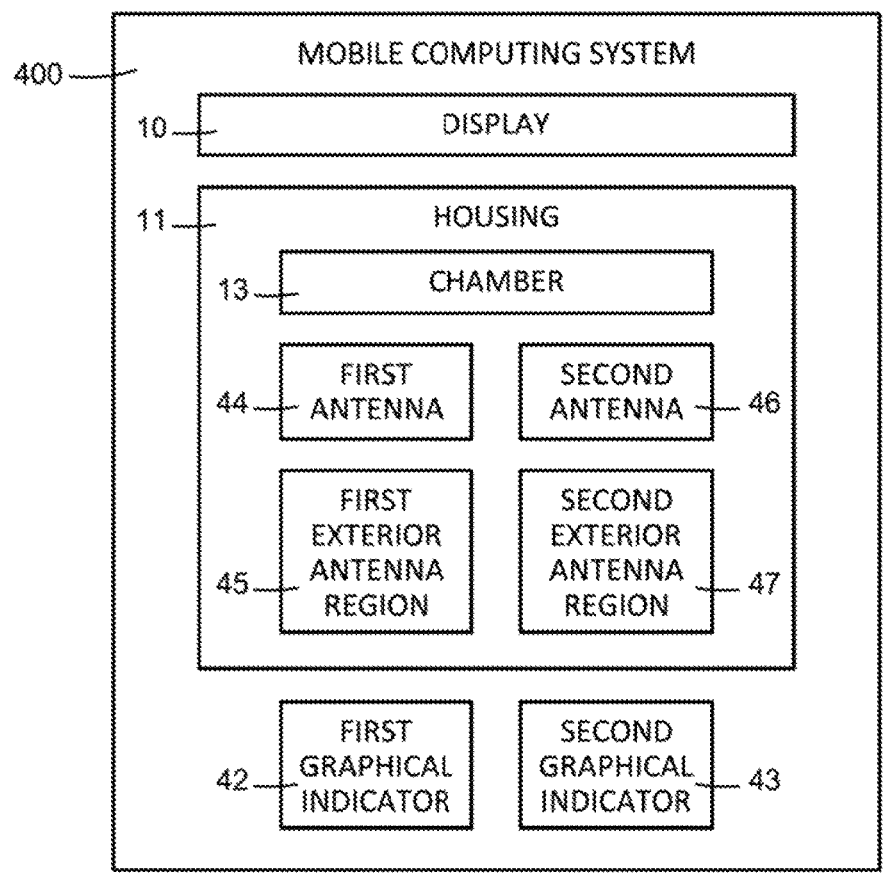
FIG. 4 is a block diagram illustrating a mobile computing system according to an example.
Figure 5:
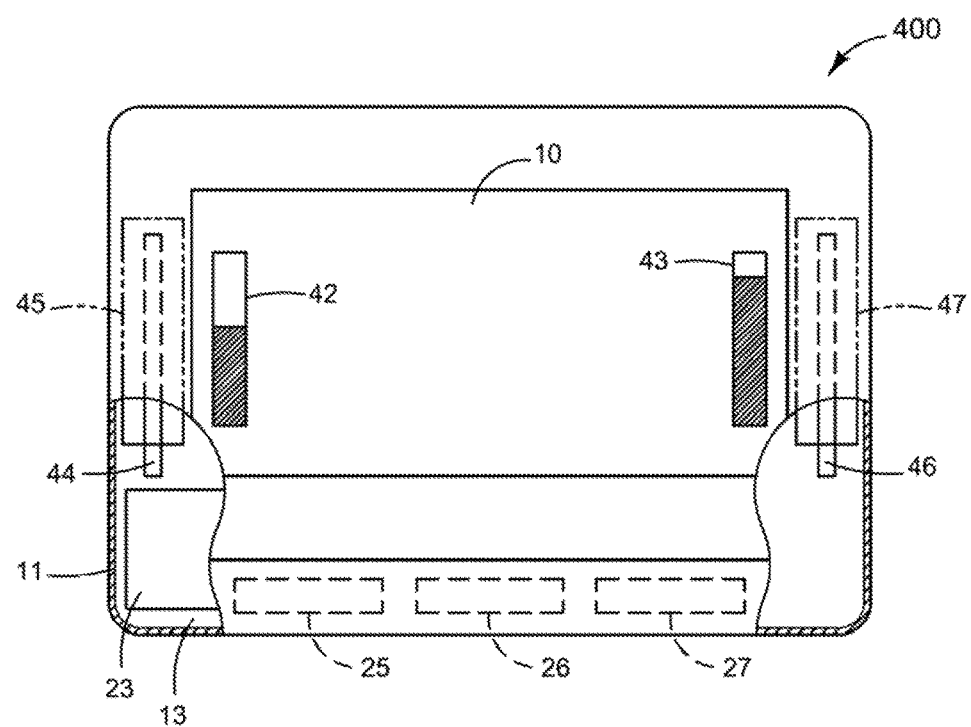
FIG. 5 is a schematic view illustrating a mobile computing system according to an example.

FIG. 4 is a block diagram illustrating a mobile computing system according to an example. FIG. 5 is a schematic view illustrating a mobile computing system according to an example. Referring to FIGS. 4 and 5, in some examples, a mobile computing system 400 includes a display 10, a housing 11, a first graphical indicator 42, and a second graphical indicator 43. The housing 11 is coupled to the display 10. In some examples, the mobile computing system 400 may also include a location module 25, a signal detection module 26, and a graphics module 27. The housing 11 includes a chamber 13, a first antenna 44 to communicate with a first wireless network, a first exterior antenna region 45, a second antenna 46 to communicate with a second wireless network, and a second exterior antenna region 47. The first graphical indicator 42 identifies the first exterior antenna region 45 on the housing 11 and a first signal strength of a connection to the first wireless network. The second graphical indicator 43 identifies the second exterior antenna region 47 on the housing 11 and a second signal strength of a connection to the second wireless network. In some examples, the first wireless network is a wireless wide area network (WWAN) and the second wireless network is a wireless local area network (WLAN).

Referring to FIGS. 4 and 5, in some examples, the first graphical indicator 42 and the second graphical indicator 43 selectively appear on the display 10 in response to at least one of a manual user event and an automatic event. For example, the manual user event may include selection of a key by a user (e.g., hot key, function key, etc.), issuing a voice command by a user, and the like. Alternatively, the automatic event corresponds to a reduction of signal strength below a predetermined signal strength threshold. Further, the automatic event may correspond to a reduction of a threshold signal strength amount within a predetermined time period.

In some examples, the first graphical indicator 42 is a first dialog region to appear on the display 10 adjacent to the first exterior antenna region 45 indicative of a location of the first antenna 44. The first graphical indicator 42 also includes a first graphical representation of the first signal strength. The second graphical indicator 43 is a second dialog region to appear on the display 10 adjacent to the second exterior antenna region 47 indicative of a location of the second antenna 46. The second dialog region also includes a second graphical representation of the second signal strength. In some examples, the location module 25 determines the location of the first antenna 44 and the second antenna 46, the signal detection module 26 determines the first signal strength of the first wireless network and the second signal strength of the second wireless network, and the graphics module 27 displays the first graphical indicator 42 and the second graphical indicator 43 on respective locations on the display 10. The location module 25, the signal detection module 26, and the graphics module 27 may include hardware and/or software as previously described with respect to the mobile computing device 200 of FIGS. 2 and 3.

At times, a user may hold the mobile computing system 400 in an orientation in which the users hand contacts the first exterior antenna region 45 and/or the second exterior antenna region 47 of the housing 11 reducing the effectiveness of the first antenna 44 and/or second antenna 46. For example, the users hand may shield the first antenna 44 and second antenna 46 resulting in reducing the respective signal strengths and detuning of the corresponding first and second antennas 44 and 46. Thus, the user may reorient the mobile computing system 400 and hold a different portion of the housing 11 outside of the first exterior antenna region 45 based on the first graphical indicator 42 identifying the first exterior antenna region 45 and the first signal strength, and outside of the second exterior antenna region 47 based on the second graphical indicator 43 identifying the second exterior antenna region 47 and the second signal strength.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope or the general inventive concept is limited only by the elements and limitations as used in the claims.

What is claimed is:

1. A mobile computing device, comprising:
   a display;
   a housing coupled to the display, the housing including a chamber, a first antenna to communicate with a first wireless network, a first exterior antenna region, a second antenna to communicate with a second wireless network, and a second exterior antenna region;
   a first graphical indicator to identify the first exterior antenna region on the housing and a first signal strength of a connection to the first wireless network; and
   a second graphical indicator to identify the second exterior antenna region on the housing and a second signal strength of a connection to the second wireless network.

2. The mobile computing device of claim 1, wherein the first graphical indicator is to selectively appear on the display in response to an event.

3. The mobile computing device of claim 2, wherein the event comprises one of a manual user event and an automatic event.

4. The mobile computing device of claim 3, wherein the automatic event corresponds to a reduction of the first signal strength below a predetermined signal strength threshold.

5. The mobile computing device of claim 3, wherein the automatic event corresponds to a reduction of a threshold signal strength amount within a predetermined time period.

6. The mobile computing device of claim 3, wherein the manual user event corresponds to one of a user touching a key and a user issuing a voice command.

7. The mobile computing device of claim 1, wherein the first graphical indicator is a dialog region to appear on the display proximate to the first exterior antenna region and includes a graphical representation of the first signal strength.

8. The mobile computing device of claim 7, wherein the graphical representation of the first signal strength corresponds to at least one of a plurality of colors, a plurality of symbols, and an amount of fill of a first image.

9. The mobile computing device of claim 1, wherein a location of the first graphical indicator on the display is indicative of a location of the first antenna.

10. The mobile computing system of claim 1, wherein the first graphical indicator and the second graphical indicator selectively appear on the display in response to at least one of a manual user event and an automatic event.

11. The mobile computing system of claim 1, wherein:
   the first graphical indicator is a first dialog region to appear the display adjacent to the first exterior antenna region indicative of a location of the first antenna and includes a first graphical representation of the first signal strength; and
   the second graphical indicator is a second dialog region to appear on the display adjacent to the second exterior antenna region indicative of a location of the second antenna and includes a second graphical representation of the second signal strength.

12. The mobile computing system of claim 1, wherein the first wireless network is a wireless wide area network (WWAN) and the second wireless network is a wireless local area network (WLAN).

13. A method comprising:
   communicating, via a first antenna, with a first wireless network;
   identifying a first exterior antenna region on a housing and a first signal strength of the first wireless network with a first graphical indicator;
   communicating, via a second antenna, with a second wireless network; and
   identifying a second exterior antenna region on the housing and a second signal strength of the second wireless network with a second graphical indicator, wherein the first graphical indicator and the second graphical indicator selectively appear on a display in response to one of a manual user event and an automatic event.

14. The method of claim 13, wherein the automatic event corresponds to a reduction of a threshold signal strength amount within a predetermined time period.

15. The method of claim 13, wherein the manual user event corresponds to one of a user touching a key and a user issuing a voice command.

* * * * *

UNITED STATES PATENT AND TRADEMARK OFFICE
CERTIFICATE OF CORRECTION

PATENT NO. : 10,171,188 B2  
APPLICATION NO. : 15/517710  
DATED : January 1, 2019  
INVENTOR(S) : Isaac Lagnado Page 1 of 1

It is certified that error appears in the above-identified patent and that said Letters Patent is hereby corrected as shown below:

In the Claims

In Column 6, Claim 10, Line 21, delete "system" and insert -- device --, therefor.

In Column 6, Claim 11, Line 25, delete "system" and insert -- device --, therefor.

In Column 6, Claim 12, Line 36, delete "system" and insert -- device --, therefor.

Signed and Sealed this  
Fifth Day of March, 2019

Andrei Iancu  
*Director of the United States Patent and Trademark Office*